United States Patent Office 3,281,427
Patented Oct. 25, 1966

3,281,427
N-PHTHALIMIDOMETHOXYMETHYL-O,O-DIAL-KYL PHOSPHORODITHIOATE DERIVATIVES
Llewellyn W. Fancher, Lafayette, Calif., assignor to Stauffer Chemical Company, New York, N.Y., a corporation of Delaware
No Drawing. Filed Jan. 12, 1965, Ser. No. 425,071
6 Claims. (Cl. 260—326)

This invention relates to certain new and novel N-phthalimidomethoxymethyl-O,O-dialkyl phosphorodithioates and their use as insecticides and acaricides. The compounds are particularly valuable for their systemic and contact miticidal properties. More specifically, this invention relates to compounds of the general formula

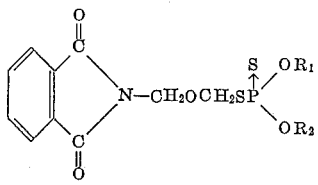

wherein $R_1$ and $R_2$ are lower alkyl, and this invention includes methods of preparing, using and applying said compositions.

The organic phthalimidoether phosphorodithioates of this invention are prepared by condensation reaction between a dialkyldithiophosphoric acid, formaldehyde and N-hydroxymethylphthalimide in the presence of a stable acid catalyst, such as 2-naphthalene sulfonic acid monohydrate.

The compounds of the present invention may be made in accordance with the following non-limiting example.

EXAMPLE

*Preparation of N-phthalimidomethoxymethyl-O,O-diethyl phosphorodithioate.*—To 22.3 g. (0.12 M) of diethyldithiophosphoric acid was added with cooling below 15° C., 10 cc. (0.13 M) of 37 percent formalin. The mixture was transferred to a separatory funnel in which had been placed 5 cc. of saturated aqueous sodium chloride and 75 cc. of benzene. After thorough mixing the layers were allowed to separate. The bottom aqueous phase was re-extracted with 25 cc. of benzene. The benzene phase and extract were combined, dried over anhydrous magnesium sulfate and filtered into a reaction flask.

The flask was equipped with an apparatus for continuous removal of water. To the reaction flask was added 17.7 g. (0.1 M) of N-hydroxymethylphthalimide and 1.0 g. of 2-naphthalene sulfonic acid monohydrate. The mixture was stirred and refluxed until the theoretical quantity of water was obtained. This required several hours. After cooling to 15° C., the mixture was filtered from a small amount of solid impurity, then washed several times with water, dried over anhydrous magnesium sulfate, filtered, and the benzene removed on a steam-bath with an air-jet. By this means there was obtained a crude product weighing 24.6 g., $n_D^{30}$=1.5639, which by analysis contained approximately 50 percent by weight of the title compound. Bioassay of the purified component displayed high insecticidal activity. Purification was accomplished by means of column chromatography.

The following is a list of the compounds prepared according to the aforedescribed procedure. Compound numbers have been assigned to each compound and are used throughout the balance of the application.

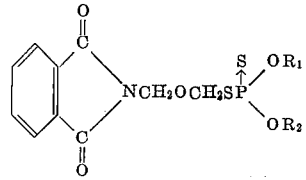

| Compound No. | $R_1$ | $R_2$ |
|---|---|---|
| 1 | $CH_3$ | $CH_3$ |
| 2* | $C_2H_5$ | $C_2H_5$ |
| 3 | $i\text{-}C_3H_7$ | $i\text{-}C_3H_7$ |
| 4 | $CH_3$ | $C_2H_5$ |
| 5 | $CH_3$ | $n\text{-}C_3H_7$ |
| 6 | $CH_3$ | $i\text{-}C_3H_7$ |
| 7 | $C_2H_5$ | $n\text{-}C_3H_7$ |
| 8 | $C_2H_5$ | $i\text{-}C_3H_7$ |

*No. 2 prepared in the example.

As previously mentioned, the herein described compositions produced in the above described manner are biologically active compounds which are useful and valuable in controlling various pest organisms. The compounds of this invention were tested as miticides in the following manner.

*Miticide evaluation test.*—The two-spotted mite *Tetranychus telarius* (Linn.) was employed in tests for miticidal activity. Young pinto bean plants in the primary leaf stage were used as host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221®, an emulsifying agent, the amount of water being sufficient to give concentrations of active ingredient ranging from 0.25% to 0.005%. The test suspensions were then sprayed on the infested pinto bean plants. After seven days, mortalities of post-embryonic and ovicidal forms were determined. The percentage of kill was determined by comparison with control plants which had not been sprayed with the candidate compounds. The LD–50 value was calculated using well-known procedures. The LD–50 values are reported under the columns "PE" and "Eggs" in the table below.

*Systemic evaluation test.*—This test evaluated the root absorption and upward translocation of the candidate systemic compound. The two-spotted mite, *Tetranychus telarius* (Linn.) was employed in tests for systemic activity. Young pinto bean plants in the primary leaf stage were used as host plants. The pinto bean plants were placed in bottles containing 200 ml. of the test solution and held in place with cotton plugs. Only the roots were immersed. The solutions were prepared by dissolving the compounds to be tested in a suitable solvent, usually acetone, and then diluting with distilled water. The final acetone concentration never exceeds about 1%. The toxicants were initially tested at a concentration of 10 parts per million (p.p.m.). Immediately after the plants were placed in the test solutions they were infested with mites. Mortalities were determined after seven days. The percentage of kill was determined by comparison with control plants which had been placed in distilled water only. The LD–50 value was calculated using well-known procedures. The LD–50 values in p.p.m. are reported under the column "Systemic" in the following table.

TABLE

| Compound No. | Two-Spotted Mites LD-50 | | Systemic (p.p.m.) |
|---|---|---|---|
| | PE | Eggs | |
| | (percent concentration) | | |
| 1 | .01 | | 3 |
| 2 | .005 | .008 | 5 |
| 3 | .10 | | |
| 4 | .003 | .005 | 3 |
| 5 | .001 | .008 | 8 |
| 6 | .001 | .008 | 2 |
| 7 | .003 | .008 | 8 |
| 8 | .001 | .005 | 10 |

Compounds number 1, 2, 4 and 5 were also found to be particularly effective for the control of such pests as adult houseflies (*Musca domestica* (Linn.)) at concentrations less than or equal to 10 micrograms, and compounds number 1 and 2 were found to satisfactorily control nymphs of the American cockroach (*Periplaneta americana* (Linn.)) at 0.05 percent concentration.

From these data it can be seen that these new compounds are valuable insecticides and acaricides. They may be used in the form of emulsions, non-aqueous solutions, wettable powders, vapors, dusts, and the like, as may be best fitted to the particular utility. The application to a pest habitat of the compounds of the present invention are well known to those skilled in the art.

Various changes and modifications may be made without departing from the spirit and scope of the invention described herein as well be apparent to those skilled in the art to which it pertains. It is accordingly intended that the present invention shall only be limited by the scope of the appended claims.

I claim:
1. Compounds corresponding to the formula

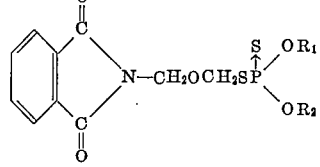

wherein $R_1$ and $R_2$ are lower alkyl.

2. The compound, N-phthalimidomethoxymethyl-O,O-diethylphosphorodithioate.

3. The compound, N - phthalimidomethoxymethyl-O-methyl-O-ethylphosphorodithioate.

4. The compound, N - phthalimidomethoxymethyl-O-methyl-O-isopropylphosphorodithioate.

5. The compound, N - phthalimidomethoxymethyl-O-ethyl-O-n-propylphosphorodithioate.

6. The compound, N - phthalimidomethoxymethyl-O-ethyl-O-isopropylphosphorodithioate.

References Cited by the Examiner

UNITED STATES PATENTS

| 2,767,194 | 10/1956 | Fancher | 260—326 |
| 3,031,459 | 4/1962 | Huebner | 260—326 |
| 3,097,132 | 7/1963 | Wiegand | 167—33 |
| 3,098,002 | 7/1963 | Reddell | 167—33 |

ALEX MAZEL, *Primary Examiner.*

MARY U. O'BRIEN, *Assistant Examiner.*